United States Patent
Singla Casasayas

(10) Patent No.: US 9,669,735 B2
(45) Date of Patent: Jun. 6, 2017

(54) SEAT FOR VEHICLES

(71) Applicant: FABRICACION ASIENTOS VEHICULOS INDUSTRIALES, S.A., Martorelles (ES)

(72) Inventor: Juan Singla Casasayas, Martorelles (ES)

(73) Assignee: FABRICACION ASIENTOS VEHICULOS INDUSTRIALES, S.A., Martorelles (ES)

(*) Notice: Subject to any disclaimer, the term of this patent is extended or adjusted under 35 U.S.C. 154(b) by 10 days.

(21) Appl. No.: 14/276,367

(22) Filed: May 13, 2014

(65) Prior Publication Data
US 2014/0346829 A1 Nov. 27, 2014

(30) Foreign Application Priority Data

May 22, 2013 (EP) .................................... 13382189

(51) Int. Cl.
| | | |
|---|---|---|
| *B60N 2/66* | (2006.01) | |
| *B60N 2/02* | (2006.01) | |
| *B60N 2/22* | (2006.01) | |
| *A47C 1/023* | (2006.01) | |

(52) U.S. Cl.
CPC ................ *B60N 2/02* (2013.01); *A47C 1/023* (2013.01); *B60N 2/2209* (2013.01); *B60N 2/66* (2013.01)

(58) Field of Classification Search
None
See application file for complete search history.

(56) References Cited

U.S. PATENT DOCUMENTS

| | | | | |
|---|---|---|---|---|
| 2,558,171 | A * | 6/1951 | Chesley | 297/354.1 |
| 3,619,879 | A * | 11/1971 | Shirakawa | 29/91.1 |
| 6,206,466 | B1 * | 3/2001 | Komatsu | 297/216.13 |
| 6,755,467 | B1 * | 6/2004 | Chu | 297/284.1 |
| 7,874,618 | B2 * | 1/2011 | Kohl et al. | 297/284.4 |

(Continued)

FOREIGN PATENT DOCUMENTS

| | | |
|---|---|---|
| DE | 42 28 849 C1 | 10/1993 |
| EP | 1 970 245 A2 | 9/2008 |

(Continued)

OTHER PUBLICATIONS

European Search Report of EP 13 38 2189 dated Jul. 17, 2013.

*Primary Examiner* — Charles A Fox
*Assistant Examiner* — Christopher e Veraa
(74) *Attorney, Agent, or Firm* — Sughrue Mion, PLLC

(57) ABSTRACT

The present invention relates to a seat for vehicles, comprising a backrest part with a support frame and a respective lining; a seat part; and a chassis to which the support frame of the backrest part is firmly attached and to which the seat part is attached such that it can shift forward or backward, the backrest part being provided with a rotating vane between the support frame and its lining, with an upper end attached in an articulated manner to the frame or to the chassis and with a lower end provided with a slide where a thrust pin arranged in the rear area of the seat part slides, such that the rotation of the vane with respect to the frame or the chassis shifts the seat and modifies the profile of the lining in the area covering the vane and therefore the shape of the support surface that the backrest part offers the user.

17 Claims, 5 Drawing Sheets

(56) References Cited

U.S. PATENT DOCUMENTS

| | | | |
|---|---|---|---|
| 8,162,399 B2* | 4/2012 | Demontis et al. | 297/284.4 |
| 8,439,435 B2* | 5/2013 | Gaither et al. | 297/118 |
| 8,474,912 B2* | 7/2013 | Lockwood et al. | 297/342 |
| 8,752,896 B2* | 6/2014 | Takeuchi et al. | 297/300.2 |
| 8,827,365 B2* | 9/2014 | Gaither et al. | 297/342 |
| 8,973,994 B2* | 3/2015 | Muck et al. | 297/284.7 |
| 2002/0180248 A1* | 12/2002 | Kinoshita | A47C 1/023 297/284.1 |
| 2010/0096899 A1* | 4/2010 | Kato et al. | 297/452.58 |
| 2011/0233979 A1* | 9/2011 | An | 297/284.4 |
| 2014/0062153 A1* | 3/2014 | Grove et al. | 297/284.4 |
| 2014/0125103 A1* | 5/2014 | Suzuki | 297/284.7 |
| 2015/0108806 A1* | 4/2015 | Nagayasu et al. | 297/337 |

FOREIGN PATENT DOCUMENTS

| | | |
|---|---|---|
| ES | 2 323 086 T3 | 7/2009 |
| WO | 2012/086803 A1 | 6/2012 |

\* cited by examiner

SEAT FOR VEHICLES

TECHNICAL FIELD OF THE INVENTION

The invention relates to a seat for vehicles, comprising a backrest part with a lining and suitable means for forcing the lining to adopt different shapes in the area intended for supporting a user's lumbar vertebrae.

BACKGROUND OF THE INVENTION

Different proposals for a seat with a backrest that can be collapsed about a shaft fixed to a seat anchoring element or to a component that is fixed with respect to the seat are known for the purpose of improving user comfort.

More specific proposals seeking that only part of the backrest can adopt different shapes, for example for better supporting the user's lumbar area without the upper part of the backrest changing its orientation or shape are also known.

The proposal described in patent document ES 2323086 is known in this sense, said patent document describing a seat with a collapsible backrest part and a seat part that can shift forward and backward, causing a lordotic-like deformation of the lining of the backrest in the area of the lumbar vertebrae, which is also transmitted to the upper part of the lining in an unwanted manner.

More specifically, according to this proposal the lining of the backrest rests in the area of the lumbar vertebrae on a pivoting body placed between the frame of the backrest and its lining, attached in an articulated manner to the seat part at its lower end. This pivoting body rests, at a certain distance from its articulated attachment with the seat part, against a non-deformable spacing element placed between the pivoting body and the frame of the backrest. As a result, according to the position of the articulated attachment of the pivoting body with the seat part with respect to the vertical of the support point of said pivoting body on the spacing element, the upper part of the pivoting body will be more or less separated from the frame of the backrest, forcing the lining to adopt one shape or another, in this case adopting a shape ranging from significantly bulging forward to slightly bulging backward.

As a drawback, the existence of the spacing element prevents the lining from being able to adopt a shape that is complementary to the shape of the frame of the backrest, since always one of the ends of the spacing body or both ends thereof at the same time will be separated from the mentioned frame of the backrest.

On the other hand, the large separation of the upper part of the pivoting body with respect to the frame of the backrest when the seat part is shifted backward or adopts an intermediate position prevents the lining from being able to be attached to the mentioned frame of the backrest in the middle area thereof. In fact, the deformation of the lining in the area of influence of the pivoting body is such that said deformation is transmitted to the upper part of the lining, which cannot be firmly adhered to the frame of the backrest.

Concerning the articulated attachment between the pivoting body and the seat part, the pivoting body has a pivoting shaft in the part lower which is arranged in the rear area of the seat part, which means that the shaft is shifted during the shifting movement of the seat part to the same extent to which the seat is shifted. Although this can condition obtaining a position of maximum comfort, the articulated attachment between the pivoting body with the seat part is adopted to assure that the separation between the respective linings does not increase, even though their relative position changes, i.e., so that the gap or space separating the lining of the backrest part from the lining of the seat part does not increase.

On the other hand, in the proposal according to ES 2323086 the base frame of the seat on which the seat part shifts has in its front part a sloping area which forces the front area of the seat part to be automatically elevated when the seat part shifts forward. Accordingly, any forward movement of the seat part causes the raising of the front area of the seat part. This can hinder the operation for changing the shape in the lining of the backrest part since the user, in addition to pulling the seat part forward must be careful not to support his/her weight on the seat part in order to not create an obstacle for the lifting of the front part thereof. If the front part is prevented from lifting up, the seat part cannot shift forward and therefore the pivoting shaft around which rotates the pivoting body cannot move. Therefore, the shape of the lining of the backrest part cannot be changed.

A first objective of the invention is an alternative proposal with respect to the one described in patent document ES 2323086.

Another objective of the invention is to also disclose a simpler constructive solution which solves the problems mentioned above and is furthermore compatible with a seat of the type with a frame of the backrest part fixed with respect to a support or base element of the seat, i.e., with a non-reclinable seat.

It is furthermore desirable for the seat to have the maximum number of components in common with that of a seat without the possibility of deformation of the lumbar area of the backrest, and which can more specifically share the lining.

DISCLOSURE OF THE INVENTION

The seat for vehicles according to the invention comprises a backrest part with a support frame and a respective lining; a seat part; and a chassis to which the support frame of the backrest part is firmly attached and to which the seat part is attached such that it can shift forward or backward.

The seat is essentially characterized in that the backrest part is provided with a rotating vane between the support frame and its lining, with an upper end attached in an articulated manner to the frame or to the chassis and with a lower end mechanically linked to the seat part by means comprising a slide and a thrust pin slidably inserted thereto, the seat part being mechanically linked to the chassis by means of a set of tracks or guides and corresponding runners or pins guiding the forward or backward shifting of the seat part with respect to the chassis, the vane being arranged centered on the support frame, leaving respective side bands of the frame to which respective facing side bands of the lining are attached accessible on both sides of the vane, such that the rotation of the vane with respect to the frame or the chassis modifies the profile of the lining in the area covering the vane, the said lining adopting a bridge-like cross-section.

The rotation of the vane with respect to the frame or the chassis modifies the profile of the lining in the area covering the vane in such a way that the shape of the support surface that the backrest part offers the user is modified.

In one embodiment, the slide is a slide with an open end that allows extracting the corresponding thrust pin, giving rise to a separable attachment between the backrest part and the seat part.

In one embodiment, the lower end of the vane is provided with a pair of slides where a corresponding pair of thrust pins arranged in the rear area of the seat part slide.

The set of tracks or guides and corresponding runners or pins allow the forward or backward shifting of the seat part between two end positions, an advanced position (A) and another back position (B), and according to another feature of the invention, when the seat part adopts its advanced position (A) the thrust pin does not rest against the bottom of the thrust slide.

According to another feature of the invention, the tracks or guides are configured for forcing the seat part to perform a movement that does not change, or does not substantially change, the vertical position of the front area of the seat part in its forward or backward shifting.

In one variant, a front pair of guides and a rear pair of guides are formed or placed in the seat part, the guides of one and the same pair being symmetrically arranged with respect to a longitudinal section plane (Y) of the seat, and the rear pair of guides have an upwardly curved section in the forward shifting direction of the seat part.

The vane is preferably formed by a plate or sheet the profile of which is similar to the profile of the support frame, such that when the seat part adopts the back position, the vane rests on the facing surface of the support frame without altering the shape of the lining which the profile of said support frame would confer to it were it not for the vane.

In one embodiment, the vane is provided on the side edges of its upper end with two flaps extending forward and each supporting an articulated attachment with a respective side panel of the support frame of the backrest part.

It has been envisaged to provide the vane at its lower end with a wing extending forward and raising the lower base of the lining when it rotates in the direction of moving away from the support frame.

In one embodiment of interest, the vane is made of a single part.

According to one embodiment, the vane is arranged centered on the support frame, leaving respective side bands of the frame to which respective side bands of the lining are attached accessible on both sides of the vane, such that when the body of the vane is separated from the mentioned frame by rotating the vane forward, the profile of the lining adopts a bridge-like cross-section: attached by its side bands to the frame and separated from the latter in its central portion.

In one embodiment, the lining is provided on its inner face with respective notches separating the side bands of the lining, attached to the frame, from the central portion resting on the vane.

In one variant, in a cross-section view, said notches are inclined with respect to the normal to the plane of the frame and towards the sides of the seat.

The lining is preferably provided with respective reinforcing elements in the notches to prevent the start of a tear at the bottom of the notches acting as a hinge between the side bands and the central portion.

In one variant, the reinforcing elements comprise a textile material with flexible properties lining the walls and the bottom of the notches.

DETAILED DESCRIPTION OF AN EMBODIMENT

Figure 1:
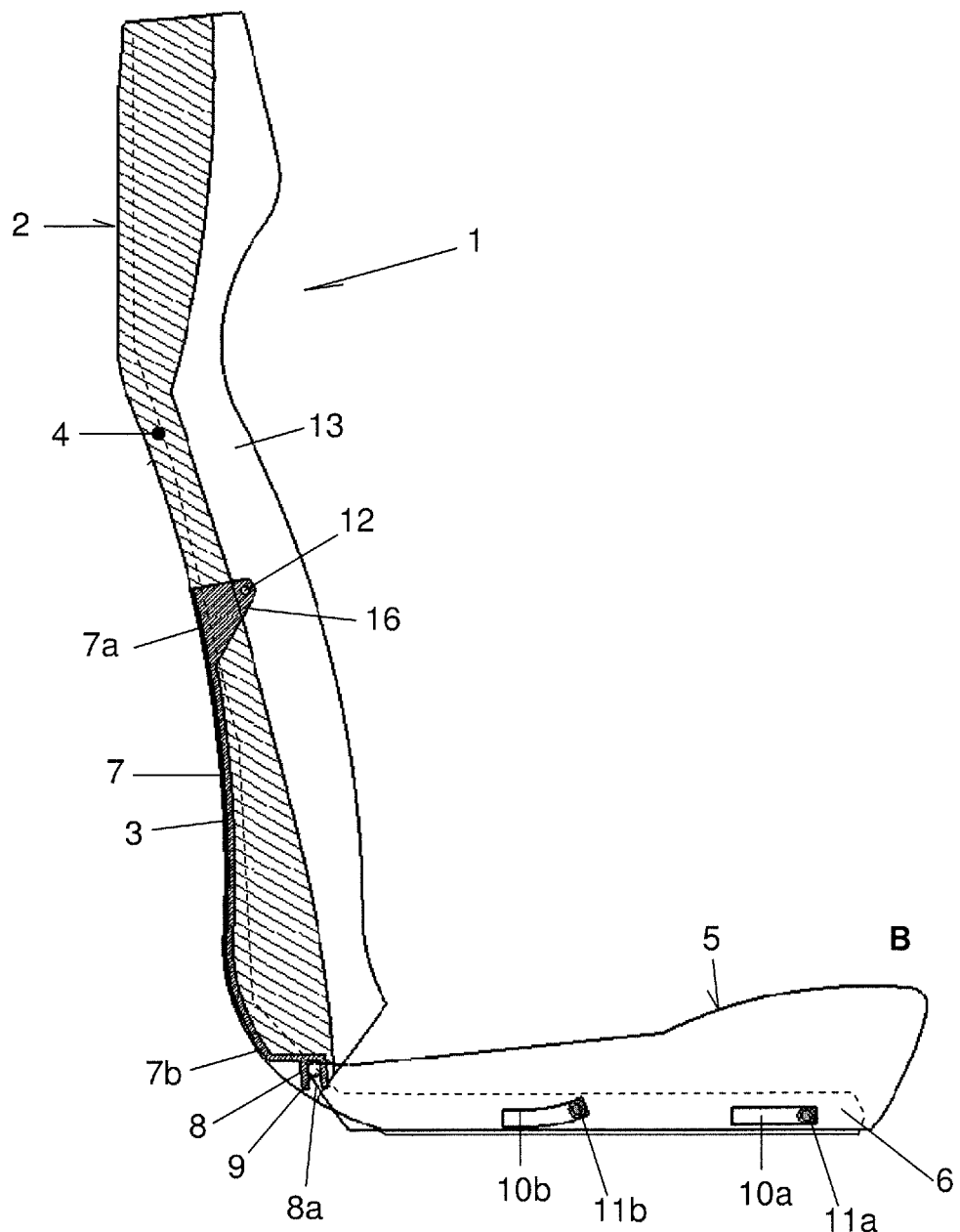
FIGS. 1 and 2 are respective section views, according to a vertical section plane, of a seat according to the invention in which the lining of the backrest part adopts two different positions.
Figure 2:
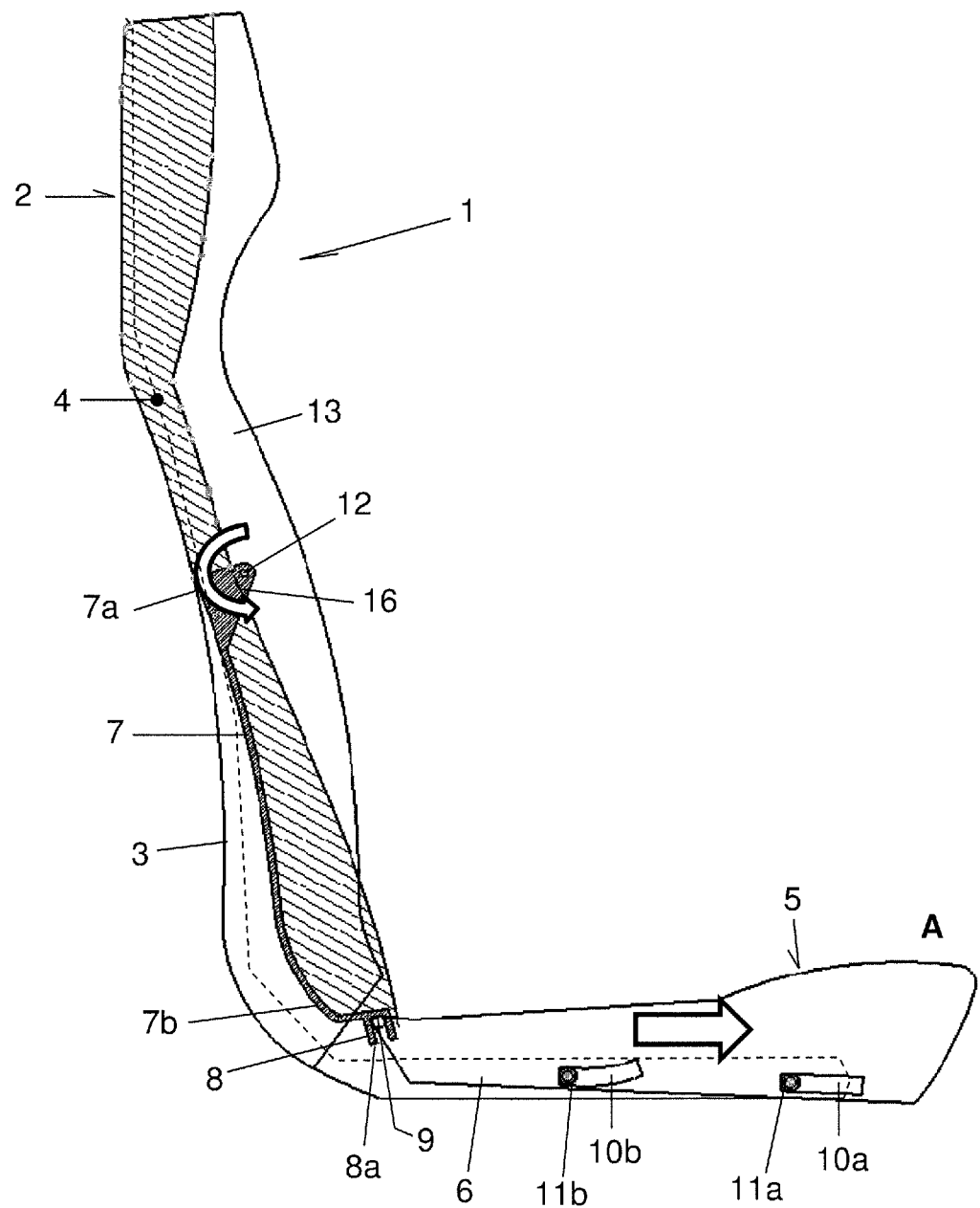

The seat 1 for vehicles of FIGS. 1 and 2 is of the type comprising a backrest part 2 and a seat part 5. The backrest part comprises in a known manner a support frame 3 and a respective covering 4, the mentioned support frame 3 being fixed with respect to a chassis 6 of the seat, intended for being anchored to the vehicle. In turn, the seat part 5 is assembled such that it can shift forward or backward with respect to the mentioned chassis 6.

The chassis 6 can be formed by a rod structure of the type comprising two vertical or inclined stringers between which the frame 3 of the backrest part 2 of the seat 1 is fixed or extends, which stringers are prolonged at their lower end in an essentially horizontal direction to which several cross-pieces are secured to form a base where the seat part 5 rests, as will be explained below.

The backrest part 2 is characteristically provided with a rotating vane 7 between the support frame 3 and its lining 4, with an upper end 7a attached in an articulated manner to the frame 3 and with a lower end 7b provided with cam surfaces mechanically linking it to the seat part 5.

In the example, the vane 7 comprises at its lower end 7b a pair of slides 8 (of which only one can be seen in FIGS. 1 and 2) where corresponding thrust pins 9 (of which only one can be seen in FIGS. 1 and 2) arranged in the rear area of the seat part 5 slide, which seat part 5 is mechanically linked to the chassis 6 by means of a set of tracks or guides 10a, 10b and corresponding runners or pins 11a, 11b the purpose of which is to guide the forward or backward shifting and orientation of the seat part 5 with respect to the mentioned chassis 6.

As shown in FIGS. 1 and 2, the forward or backward movement of this seat part 5 causes the rotation of the vane 7 with respect to the frame 3 and a modification in the profile of the lining 4 in the area resting on said rotating vane 7, changing the shape of the support surface that this part of the backrest offers the user.

For the articulated attachment between the vane 7 and the support frame 3, in the example the rotating vane 7 is provided on the side edges of its upper end 7a with two flaps 20 extending forward and each supporting an articulated attachment 12 with a respective side panel 13 of the support frame 3 of the backrest part 2. The articulated attachment 12 can be formed by buttons formed in the flaps 20 which fit into respective hubs formed in the inner wall of the side panels 13 or the other way around, or else by pins simultaneously going through both components.

It is noted that due to the effect of the slide 8, the rotation of the vane 7 does not translate into a movement of the pin 9 following a path of rotation about the shaft of the articulated attachment 12. In other words, the rotation of the vane 7 does not cause the rotating pin 9 with a center in the articulated attachment 12 to shift. This allows attenuating the lifting of the rear area of the seat part 5 and better controlling the lifting of the front area of the seat, as will be explained below.

Figure 6:
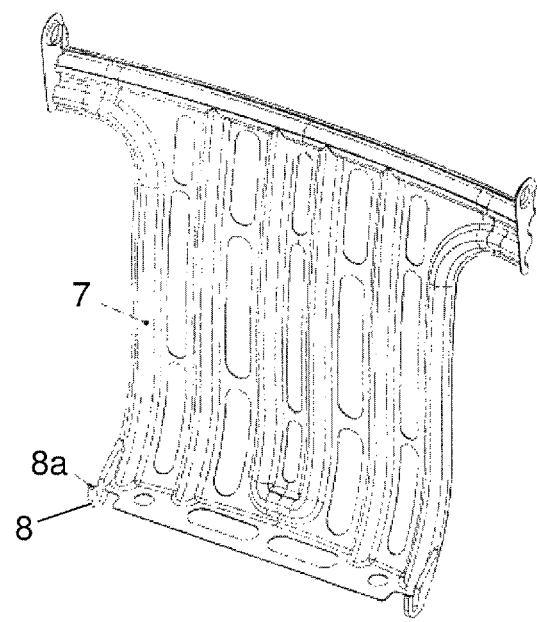
FIG. 6 shows an alternative form of realization for a vane of a seat according to the invention.

Advantageously, the slide 8 is furthermore a slide with an open end 8a that allows extracting the corresponding thrust pin 9, giving rise to a separable attachment between the backrest part 2 and the seat part 5 that facilitates disassembling the seat and the operation for replacing the respective linings or covers. While in the embodiment of the FIGS. 1 and 2 the slide 8 is configured such that the open end 8a is at the lower end of the slide 8, the FIG. 6 shows another vane 7 compatible with the seat according to the invention. In the embodiment of the FIG. 6 the open end 8a is at the upper end of the slide 8.

Despite the fact that the mere replacement of a simple articulated attachment with an attachment by means of the slide 8 could give rise to an unwanted increase of the space separating the lining 4 of the backrest part 2 with respect to the lining of the seat part 5 when the seat shifts forward, this effect is controlled if the orientation of the seat part 5 is suitably guided during shifting.

Figure 7:
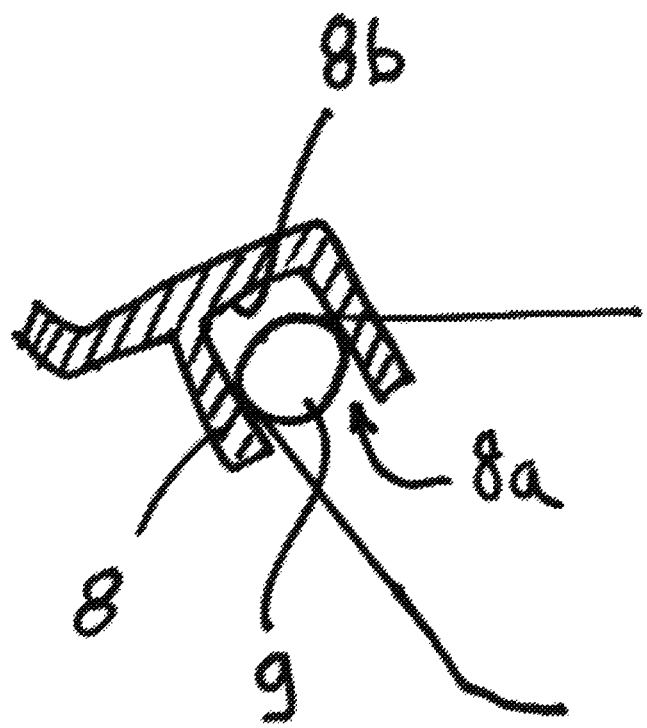
FIG. 7 shows an enlarged detail of the thrust pin and thrust slide in the advanced position of the seat part.

For this purpose, in the seat according to the invention the set of tracks or guides 10a, 10b and corresponding runners or pins 11a, 11b allow not only the forward or backward shifting of the seat part 5 between two end positions, an advanced position (A), depicted in FIG. 2, and another back position (B), depicted in FIG. 1, but rather the guides 10a are configured so that when the seat part 5 adopts its advanced position (A) the thrust pin 9 does not rest against the bottom of the thrust slide 8 as shown in FIG. 7, and they are further configured for forcing the seat part 5 to perform a movement that does not change, or does not substantially change, the vertical position of the front area of the seat part 5 in its forward or backward shifting.

For this purpose, in the example of FIGS. 1 and 2, a front pair of guides 10a and a rear pair of guides 10b are formed or placed in the seat part 5, the guides of one and the same pair being symmetrically arranged with respect to a longitudinal section plane Y (see FIG. 3) of the seat 1, the rear pair of guides 10b having an upwardly curved section in the forward shifting direction of the seat part 5.

The corresponding pins 11a and 11b can be provided with respective wheels to facilitate the sliding of the seat part 5. The pins 11a and 11b are formed in or firmly attached to the chassis 6, at the base on which the seat part 5 rests.

FIGS. 1 and 2 further show how the lining 4 can adopt different shapes in the area of influence of the rotating vane 7 without affecting the part of the lining located above the articulated attachment 12 of the vane 7 with the support frame 3. Likewise, the vane 7 is formed by a plate or sheet the profile of which is similar to the profile of the support frame 3, such that when the seat part 5 adopts the back position (B) of FIG. 1, the vane 7 rests on the facing surface of the support frame 3 without altering the shape of the lining 4 which the profile of said support frame 3 would confer to it were it not for the vane 7. Accordingly, it is not necessary to provide two different lining types for the application thereof in seats with or without rotating vanes, respectively.

The vane 7 is preferably made of a single part and is provided at its lower end 7b with a wing 7c extending forward and raising and accompanying the lower base of the lining 4 when it rotates in the direction of moving away from the support frame 3.

Figure 3:
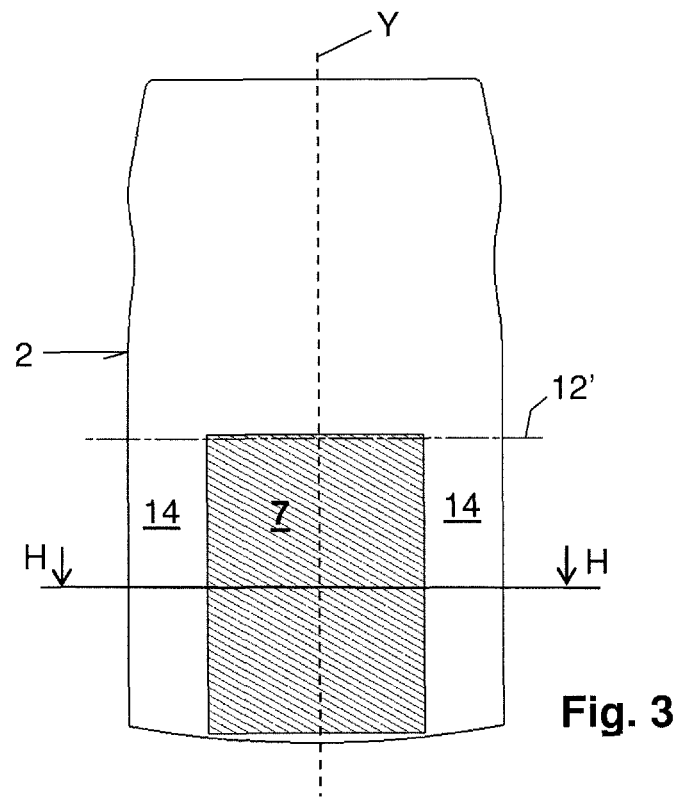
FIG. 3 is a schematic front view of the backrest part showing the area over which the rotating vane extends.
Figure 4A:
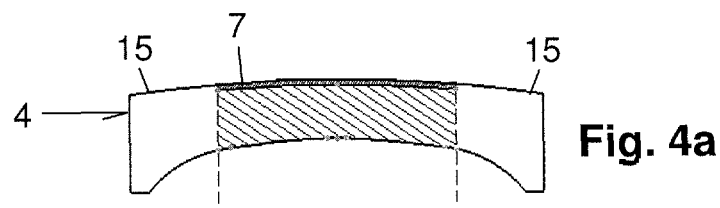
FIGS. 4a and 4b are respective views of the backrest part of FIG. 3 according to section plane AA showing the deformation of the lining when the vane goes from adopting the position depicted in FIG. 1 to adopting the position depicted in FIG. 2.
Figure 4B:
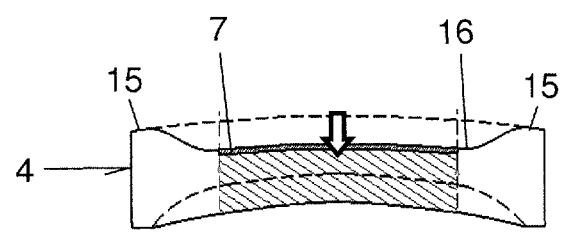

FIGS. 3, 4a and 4b show that the rotating vane 7 is arranged centered on the support frame 3, leaving respective side bands of the frame 14 to which respective side bands 15 of the lining 4 are attached accessible on both sides of the vane 7.

When the body of the vane 7 is separated from the mentioned frame 3 by rotating the vane 7 forward, the situation shown in FIG. 4b, the profile of the inner face of the lining 4 adopts a bridge-like cross-section: attached by its side bands 15 to the frame 3 and separated from the latter in its central portion 16.

Figure 5A:
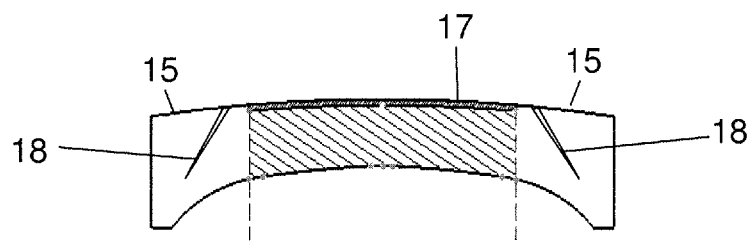
FIGS. 5a and 5b are respective views of the backrest part of FIG. 3 according to section plane AA showing the deformation of the lining when the vane goes from adopting the position depicted in FIG. 1 to adopting the position depicted in FIG. 2 in the variant in which the lining is provided with notches.
Figure 5B:
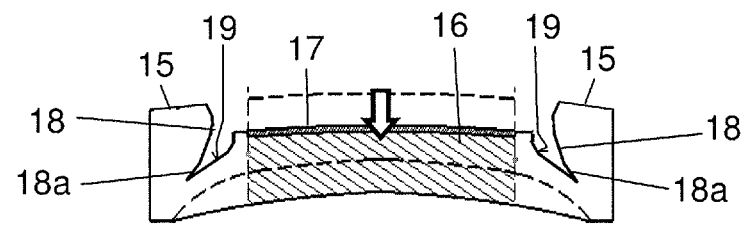

For the purpose of better controlling the deformation sustained by the lining 4, the invention envisages providing the lining 4 on its inner face 17 with respective notches 18 separating the side bands 15 of the lining 4, attached to the frame 3, from the central portion 16 resting on the vane 7, as illustrated in FIG. 5a.

It must be noted that in the example of FIG. 5a, in a cross-section view, said notches 18 are inclined with respect to the normal to the plane of the frame 3 and towards the sides of the seat 1. This particular orientation produces a very favorable effect in controlling the deformation of the lining, preventing the formation of unwanted creases in the cover covering the lining and further allowing the use of one and the same cover for simple seats and for seats according to the invention.

Forming notches 18 in the lining 4, conventionally made of foam, can be detrimental to the maintenance or the duration of the seat 1 and can be the cause of tears. To solve this drawback, the lining 4 is provided with respective reinforcing elements 19 in the notches 18 that prevent the start of a tear at the bottom 18a of the notches acting as a hinge between the side bands 15 and the central portion 16.

In one variant, these reinforcing elements comprise a textile material with flexible properties lining the walls and the bottom of the notches 18.

The invention claimed is:

1. A seat for vehicles, comprising a backrest part with a support frame and a lining; a seat part; and a chassis to which the support frame of the backrest part is firmly attached and to which the seat part is attached such that the seat part can shift forward or backward, the backrest part being provided with a rotating vane between the support frame and the lining, with an upper end attached in an articulated manner to the support frame or to the chassis and with a lower end mechanically linked to the seat part by a slide and a thrust pin slidably inserted in the slide; the seat part is mechanically linked to the chassis by a set of tracks or guides and corresponding runners or pins guiding the forward or backward shifting of the seat part with respect to the chassis, the vane being arranged centered on the support frame, leaving respective side bands of the frame to which respective facing side bands of the lining are attached accessible on both sides of the vane, such that the rotation of the vane with respect to the frame or the chassis modifies a profile of the lining in the area covering the vane, the lining adopting a bridge cross-section wherein the lining is attached by the side bands of the lining to the frame and separated from the frame at a central portion of the lining; wherein when the vane is rotated so that the profile of the lining corresponding to a lower lumbar area of the backrest extends forward in a direction of a front of the seat, the seat part shifts forward in the direction of the front of the seat; and wherein the slide comprises an open end that allows extraction of the corresponding thrust pin, giving rise to a separable attachment between the backrest part and the seat part.

2. The seat according to claim 1, wherein the set of tracks or guides and corresponding runners or pins allow the forward or backward shifting of the seat part between two end positions, an advanced position and another back position, and in that when the seat part adopts its advanced position the thrust pin does not rest against the bottom of the thrust slide.

3. The seat according to claim 1, wherein the tracks or guides are configured for forcing the seat part to perform a movement that does not change a vertical position of the front area of the seat part in the forward or backward shifting.

4. The seat according to claim 3, wherein the tracks or guides comprise a front pair of guides and a rear pair of guides formed or placed in the seat part, the guides of one and the same pair being symmetrically arranged with respect to a longitudinal section plane of the seat, and wherein the rear pair of guides have an upwardly curved section in the forward shifting direction of the seat part.

5. The seat according to claim 1, wherein the vane is formed by a plate or sheet, the profile of which is similar to a profile of the support frame, such that when the seat part adopts the back position, the vane rests on the facing surface of the support frame without altering the shape of the lining which the profile of said support frame would confer to without the vane.

6. The seat according to claim 1, wherein the vane is provided on the side edges of an upper end of the van with two flaps extending forward and each flap supporting an articulated attachment with a respective side panel of the support frame of the backrest part.

7. The seat according to claim 6, wherein the vane is made of a single one-piece construction.

8. The seat according to claim 1, wherein the vane is provided at a lower end of the vane with a wing extending forward and raising a lower base of the lining when the vane rotates in the direction moving away from the support frame.

9. The seat according to the claim 1, wherein the lining is provided on an inner face with respective notches separating the side bands of the lining, attached to the frame, from a central portion of the lining resting on the vane.

10. The seat according to claim 9, wherein in a cross-section view, said notches are inclined with respect to a normal to a plane of the frame and towards sides of the seat.

11. The seat according to claim 9, wherein the lining is provided with respective reinforcing elements in the notches to prevent a tear at a bottom of the notches the respective reinforcing elements in the notches configured to function as a flexible hinge between the side bands and the central portion.

12. The seat according to claim 11, wherein the reinforcing elements comprise a textile material with flexible properties lining the walls and the bottom of the notches.

13. The seat according to the claim 1, when the vane is rotated so that the profile of the lining corresponding to the lower lumbar area of the backrest extends forward, an inner face of the lining is attached by the side bands of the lining to the side bands of the frame and separated from the frame in the central portion of the lining.

14. The seat according to claim 1, wherein the tracks or guides are configured for forcing the seat part to move laterally forward or backwards without substantially changing a vertical position of the front area of the seat part.

15. A seat for vehicles, comprising:
a backrest part with a support frame and a lining;
a seat part; and
a chassis to which the support frame is fixedly attached so as to preclude relative movement between the chassis and the support frame;
the seat part is configured to shift forward or backward;
the backrest part is provided with a rotating vane disposed between the support frame and the lining, with an upper end of the vane attached in an articulated manner to the support frame or to the chassis and with a lower end of the vane coupled to the seat part by a slide and a thrust pin in the slide;
the seat part is coupled to the chassis by tracks or guides and corresponding runners or pins guiding the forward or backward shift of the seat part with respect to the chassis;
the vane is disposed between side ends of the support frame, leaving respective side bands of the support frame to which side bands of the lining are attached;
wherein rotation of the vane with respect to the support frame or the chassis modifies a shape of the lining, such that when the vane is rotated backwards towards the support frame, the lining assumes a first position in which a side of the lining facing the support frame has a profile matching the support frame, and when the vane is rotated forward away from the support frame, the lining assumes a second position in which the side of the lining facing the support frame displaces forward and a cross-section of the lining taken in a direction orthogonal to backrest part forms a bridge with the side bands of the lining attached to the side bands of the frame and a central portion of the lining together with the vane are separated from the support frame; and
wherein the slide is open at one end allowing extraction of the corresponding thrust pin and thereby separation of the backrest part from the seat part.

16. The seat according to claim 15, wherein, when the vane is rotated forward, the lining corresponding to a lower lumbar area of the backrest extends forward in a direction of a front of the seat and the seat part shifts forward in the direction of the front of the seat.

17. The seat according to claim 15, wherein the lining is provided with a notch on each side end separating respective side bands of the lining from a central portion of the lining so as to facilitate transition of the lining from the first position to the second position.

\* \* \* \* \*